March 22, 1960 J. S. BROWN ET AL 2,929,170
EDUCATIONAL OR INSTRUCTIVE PUPPET
Filed Feb. 25, 1957 2 Sheets-Sheet 2
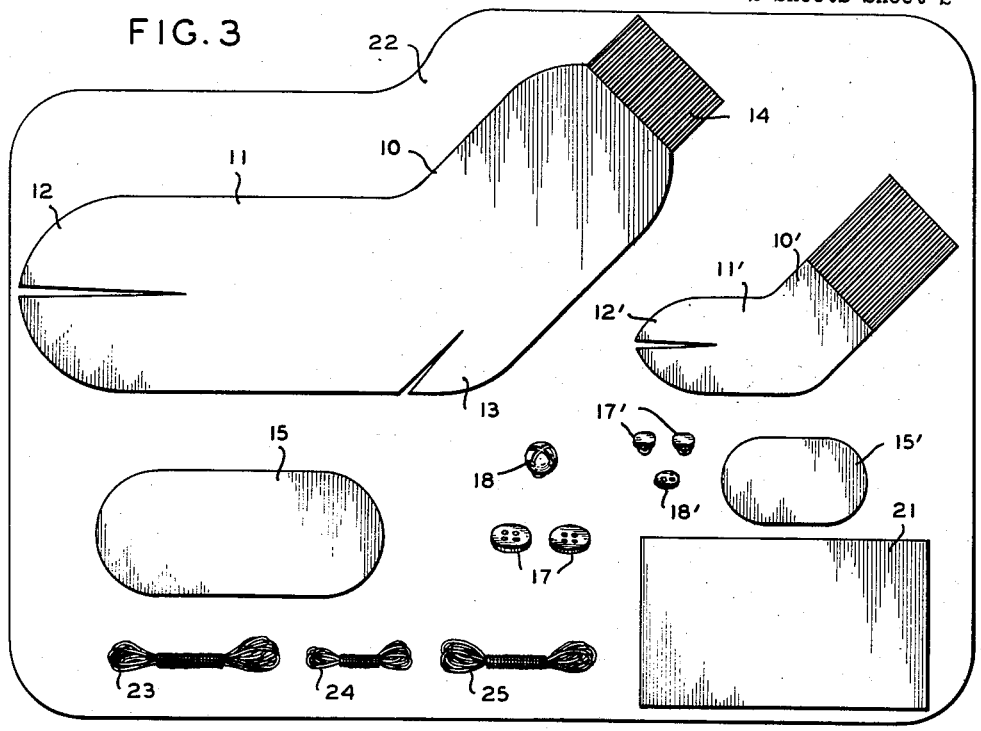
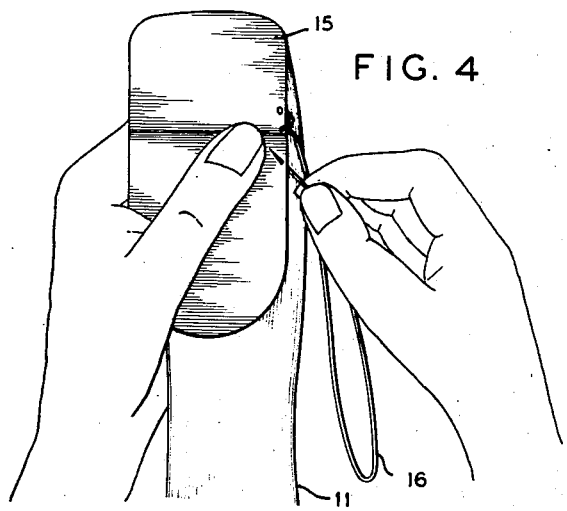
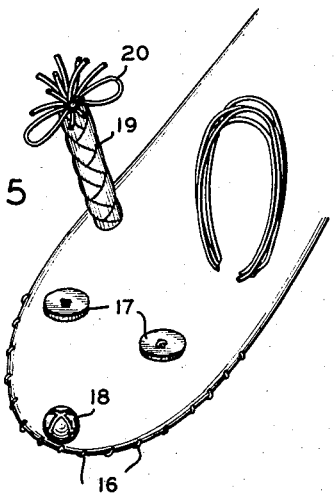
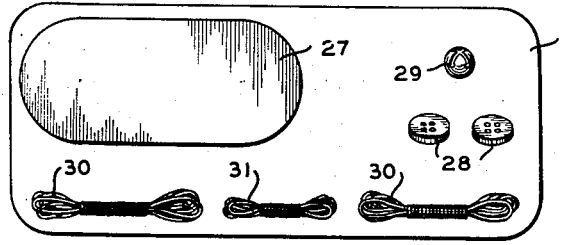
INVENTORS
JOAN S. BROWN
RAYMOND N. BROWN
BY
ATTORNEYS

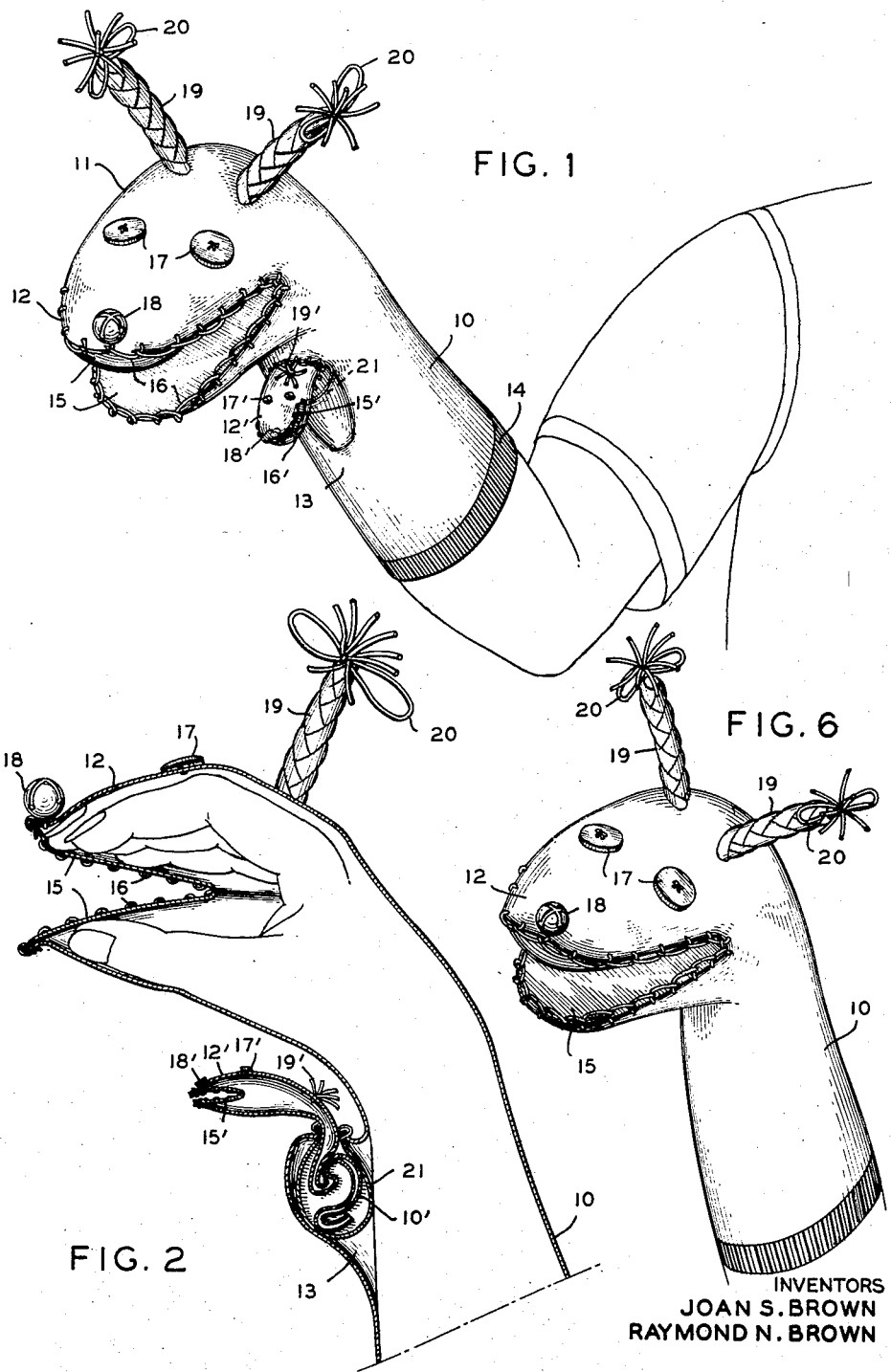

United States Patent Office

2,929,170
Patented Mar. 22, 1960

2,929,170

EDUCATIONAL OR INSTRUCTIVE PUPPET

Joan S. Brown and Raymond N. Brown,
Washington, D.C.

Application February 25, 1957, Serial No. 641,900

3 Claims. (Cl. 46—153)

This invention relates to the education, training and development of living beings including humans of all ages, and to equipment and methods by which such training and development may be promoted.

The invention relates particularly to equipment and methods involving movement or animation by which attention is attracted and interest obtained and held for a greater period of time than it would normally be retained.

It is well known that we learn to do by doing and consequently in order to accomplish the most an inanimate object is given animation by an operator and the mental and physical processes of the subject are enlisted and exercised in order to attain the desired goal. Idleness has been termed the "devil's workshop" and has been charged with causing human deliquency and it is therefore desirable to eliminate such idleness in order to promote the welfare of the individual and the community at the highest level and to develop physical, mental, moral and spiritual characteristics as well.

Much time and thought has been given to the manner of attracting and enlisting the interest of persons in order to motivate them along the desired lines to cause them to develop and mature physically, mentally, morally and spiritually and to so direct them that they keep occupied and do not suffer from idleness, all of which serves to educate, train, develop and improve the individuals so that they will be better citizens having a greater capacity for earning a livelihood and caring both for themselves and for those in whom they are interested.

It is an object of the invention to accomplish the greatest good by providing an object which a child or older person can feel and handle, and can visualize, and which can be employed to entertain, to teach appreciation of the finer things in life, such as self-reliance, cheerfulness, compatibility, and other characteristics which make for physical and mental health and happiness, as well as a step by step progression and appreciation of the progress made, as well as happiness with one's lot, and the general attainment of maximum satisfaction towards the most ideal situation of health both physical, mental, morally and spiritually and utmost in peace and happiness.

Another object of the invention is to provide an inanimate object capable of being used for stimulating activity of the body and the mind in a manner to promote the welfare of the soul and particularly the use of the imagination in the exercise of the abilities and capacities including such characteristics as self-reliance, self-expression, coordination with the capacity to entertain, cheerfulness and the appreciation of the aesthetic, all in a manner to increase personal popularity and promote peace and harmony throughout the world.

Another object of the invention is to provide an educational entertaining device in the form of a puppet capable of being used for developing, expanding, enlisting and exercising the faculties and capacities of human beings and to prepare them for situations which may later arise so that they will be in a position to adapt themselves to a situation satisfactorily, as for example, the person of one nation might wish to do when he is suddenly transferred to another country where customs were different and to, therefore, acquire those characteristics which would be of inestimable value throughout the life of the individual.

A further object of the invention is to provide a simple do-it-yourself kit which can be produced at a minimum cost from the simplest of materials from which maximum satisfaction can be obtained.

Other objects and advantages of the invention will be apparent from the following description taken in conjunction with the accompanying drawings wherein:

Fig. 1 is a perspective illustrating one application of the invention and the use of the same;

Fig. 2, a central longitudinal section;

Fig. 3, a plan view of a do-it-yourself kit;

Fig. 4, a plan view illustrating a method of sewing the mouth-forming segment in place;

Fig. 5, a fragmentary perspective illustrating one loop unbraided and a second loop braided; and Fig. 6, a perspective illustrating another application of the invention and the use thereof; and Fig. 7, a plan view of a basic do-it-yourself kit embodying the invention.

Briefly stated the invention comprises a puppet which may be made from a simple inexpensive sock and slight additional fabric, buttons, and yarn, with or without a sound producing element such as a bell, the sock being adapted to be split horizontally across the toe parallel to the sole and in which split is adapted to be fastened a mouth-forming sheet or segment by stitching, with a couple of buttons for eyes, a bell for a nose, and a couple of plaits of yarn added to simulate hair. Also, the heel may be cut and a pouch-forming segment sewn in in order to receive a much smaller or miniature puppet to simulate its young being carried by certain well known mammals in a similar pouch.

With continued reference to the drawing, the puppet of the present invention is formed of hose either a sock or a stocking having a leg 10, a foot 11 with toe and heel portions 12 and 13 and an elastic top 14. The toe portion 12 is cut horizontally from side to side substantially parallel to the sole and a mouth-forming segment 15 is doubled upon itself and is fastened in place by a buttonhole or coarse stitch 16. This permits the hand to be inserted in the manner illustrated with the thumb beneath and the four fingers above the mouth-forming segment in order to provide the necessary movement or animation to the upper and lower jaw simulating portion of the device, as shown in Figs. 1 and 2.

In order to further give the device animation and personality a pair of buttons 17 and a bell 18 may be added to simulate eyes and a nose. Also, a couple of braids 19 of coarse yarn may be attached, such braids having their ends held by bows 20.

The puppet thus described may be made of materials of multiple colors as, for example, the leg portion 10 of light color, the mouth portion 15 of dark red with light blue stitching 16 and the eyes 17 may be black while the bell 18 may be of bright tin, nickle or stainless steel. The braids 19 may be of a bright color such as light yellow with orange bows 20.

In order to further increase the attractiveness of the puppet a transverse opening in the sole of the sock adjacent the heel may be made in which is applied a pouch-forming segment 21 for the reception of the puppet's young. For example, a baby puppet simulating the larger parent puppet may be provided including a toe portion 12', a mouth-forming segment 15', stitching 16', button eyes 17', and a button or bell nose 18' as well as yarn hair 19'. The puppet thus provided is ready for use in portraying any desired action including the facts of life, The puppet illustrated in Figs. 1 and 2 may be completely assembled or may be sold in a do-it-yourself kit such as is shown in Fig. 3 in which a sock having a leg 10, foot 11, toe 12, heel 13 and elastic top 14 may be spread upon a cardboard base or other backing 22. On this card the yarn may be shown in multi-colored skeins 23, 24 and 25.

The baby sock may be made with a white nose and blue eyes and a contrasting bit of yarn such as green with the interior of the mouth red with contrasting stitching such as white or green.

As illustrated in Fig. 6 of the drawings, it is within the scope of the present invention to provide but a single puppet, without the pouch produced by the pouch-forming segment 21, constructed identically as described heretofore. Thus, the leg portion 10 of the sock may have the toe portion 12 slit horizontally and the mouth-forming segment 15 is doubled upon itself and sewn in place by the stitching 16. Buttons or the like 17, simulating eyes, are stitched or otherwise attached to the head portion of the puppet and a bell or other item 18 also is attached in any suitable manner to provide a nose. Further, as described previously, braided yarn 19, simulating hair, is attached to complete the puppet.

With reference to the do-it-yourself kit 22, described in detail hereabove, it will be understood that it is not essential that this kit include a sock or socks, two of these items being illustrated and described with reference to the kit 22 shown in Fig. 3 of the drawings. Accordingly, a basic kit 26, such as is to be found in Fig. 7 of the drawings, need include only the mouth forming segment 27, eye simulating devices 28, a nose simulating item 29, hair simulating material 30 and stitching or sewing thread 31. With such a kit 26 it is contemplated that the inclusion of appropriate instructions, coupled with illustrative matter, will permit the user to take full advantage of the present inventive teachings employing a suitable sock, stocking or other tubular element obtained from any source as the body portion of the puppet.

It will be apparent from the foregoing that the present invention is of a character to interest, enlist and encourage participation by the individual and that it promotes self-expression, self-reliance, coordination and appreciation. Also it stimulates the imagination and other mental and physical characteristics which contribute toward a well rounded life.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A decorative, educational device comprising a puppet formed of a sleeve having an opening at one end of a size to permit the insertion of the hand and with the other end provided with a generally centrally disposed slit extending from side to side to form a mouth opening, a folded sheet in said mouth opening, the edges of which are generally similar to and located adjacent the sides of said slit and with such edges stitched to said sides so that when the hand is inserted in said sleeve the thumb can be disposed beneath and the forefingers above said folded sheet and by relative movement of the thumb and forefingers similar movement can be imparted to the portions of the said sleeve above and below said sheet, a series of objects attached to said sleeve located in a manner to simulate the nose and eyes of an animate object.

2. The structure of the preceding claim in which said sleeve has a slit intermediate its ends on the opposed sides from said attached objects, a pouch forming sheet having its edges sewn along the edges of said slit and with said slit extending into said sleeve and providing a pouch simulating that of an animal and in which the young of the animal are received, and a smaller puppet removably receivable in said pouch.

3. A decorative educational device comprising a puppet made of a stocking with a slit across the toe to simulate a mouth opening, sheet material having two overlying portions within said slit with the portions lying one upon another and connected together at their inner adjacent edges and with the outer edges of such portions of sheet material being of generally similar configuration to and located adjacent the sides of said slit, stitching fastening the outer edges of said sheet material to the sides of said slit in such a manner that when the hand is inserted in the stocking the thumb and fingers can be disposed on opposite sides of the sheet material and relative movement of the thumb and fingers can be imparted to the portions of said stocking on opposite sides of said sheet material by the relative movement of the thumb and fingers, and a series of representations on said stocking to simulate the nose and eyes of an animate object.

References Cited in the file of this patent

UNITED STATES PATENTS

| | | |
|---|---|---|
| D. 92,624 | Park | June 26, 1934 |
| D. 98,062 | Gaba | Jan. 7, 1936 |
| 1,489,685 | Anderson | Apr. 8, 1924 |
| 1,659,720 | Cate | Feb. 21, 1928 |
| 2,302,349 | Renshaw | Nov. 17, 1942 |
| 2,762,163 | Stein | Sept. 11, 1956 |

FOREIGN PATENTS

| | | |
|---|---|---|
| 302,520 | Great Britain | Dec. 20, 1928 |

OTHER REFERENCES

"A Handbook of Fist-Puppets" (Ficklen), 1935, published by Lippincott (pages 74–77 relied on).